Dec. 1, 1942.   W. P. SCHMITTER   2,304,030
REVERSIBLE POWER TRANSMISSION
Filed Oct. 30, 1939   2 Sheets-Sheet 1

Walter P. Schmitter
INVENTOR.
BY
Ralph Brown
ATTORNEY.

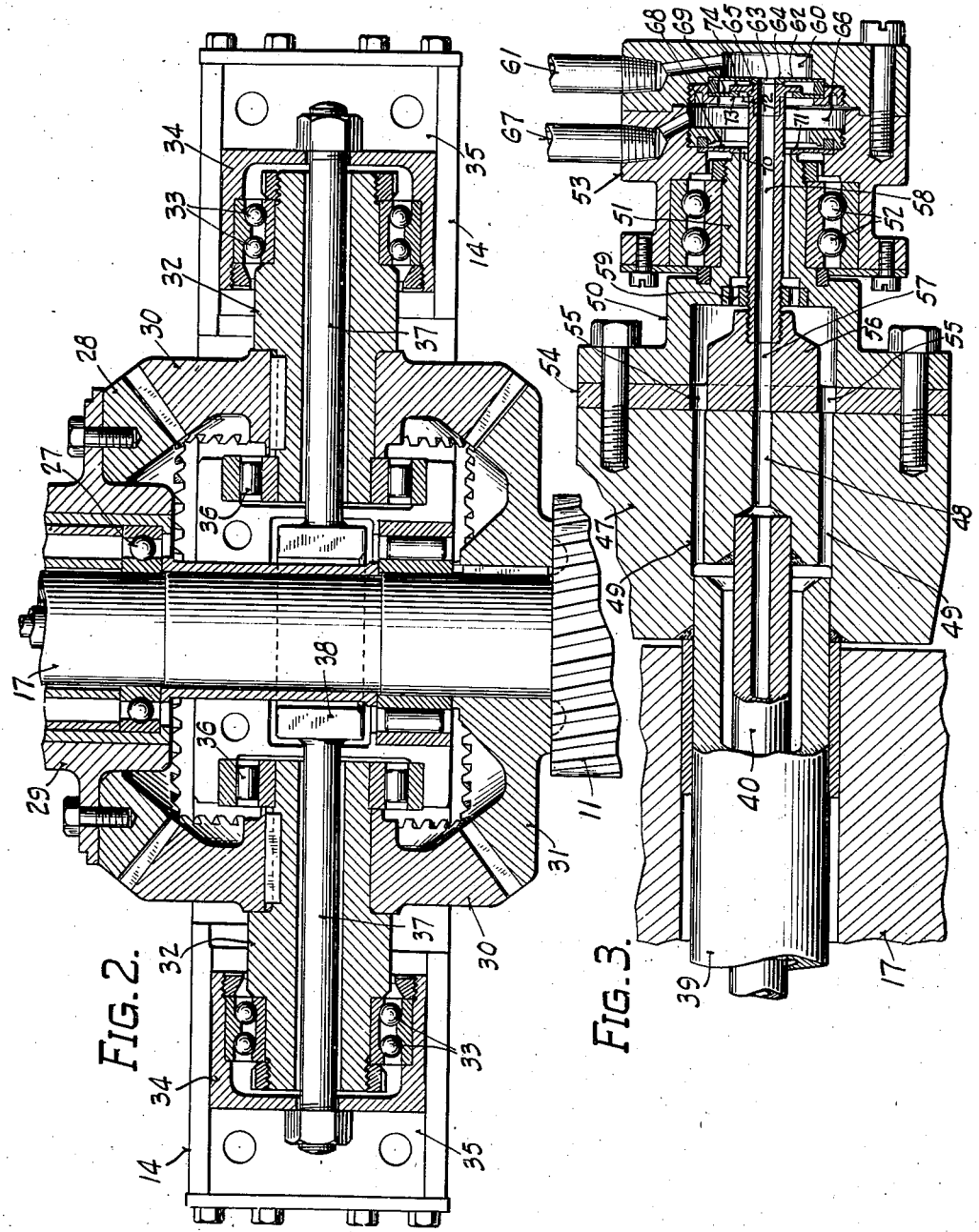

Patented Dec. 1, 1942

2,304,030

UNITED STATES PATENT OFFICE 2,304,030

REVERSIBLE POWER TRANSMISSION

Walter P. Schmitter, Wauwatosa, Wis., assignor to The Falk Corporation, Milwaukee, Wis., a corporation of Wisconsin Application October 30, 1939, Serial No. 301,930

5 Claims. (Cl. 74—379)

This invention relates to reversible power transmissions.

An object of the present invention is to provide, in a power transmission system, an improved reversing mechanism of simple compact form, readily operable to quickly reverse the direction of operation.

Other more specific objects and advantages will appear from the following description of an illustrative embodiment of the invention.

In the accompanying drawings:

Fig. 2 is a fragmentary horizontal sectional view.

Fig. 3 is a sectional view on a larger scale of the air admission device shown in Fig. 1.

Figure 1:
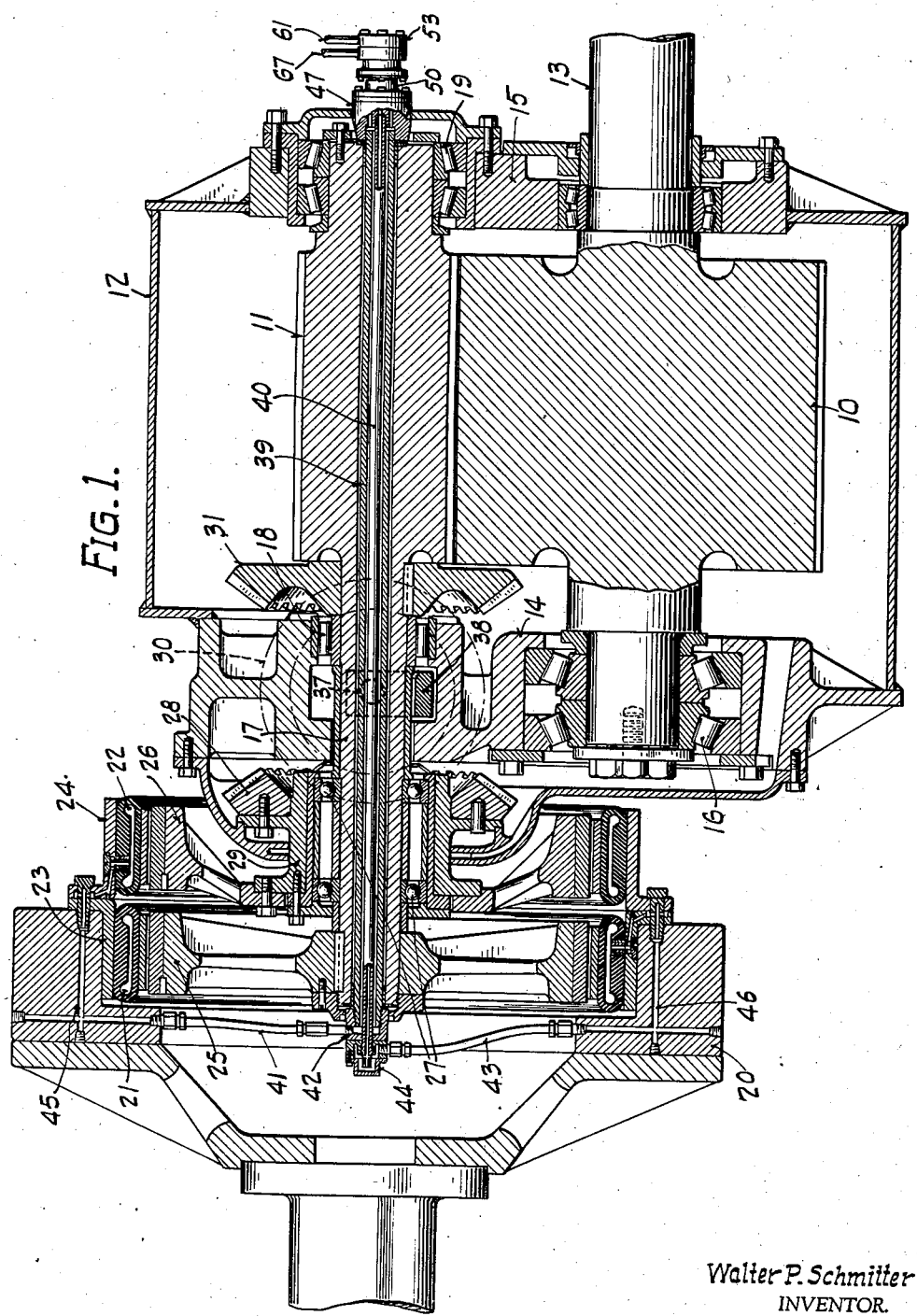
Figure 1 is a vertical sectional view of a speed reduction gear set equipped with a reversing mechanism constructed in accordance with the present invention.

The speed reduction gear set selected for illustration is designed for marine use. It comprises a conventional gear 10 meshing with a pinion 11, both arranged within an appropriate housing 12. The gear 10 is shown carried by an integral shaft 13 suitably journalled in housing frame members 14 and 15. The shaft 13 extends rearwardly from the housing for connection with a propeller shaft (not shown) and is provided at its forward end with a thrust bearing 16 adapted to sustain the propeller thrust. The pinion 11 is shown carried by an integral shaft 17 journalled at its rear end in a thrust bearing 19 in frame member 15 and projecting through and forwardly beyond a bearing 18 in the frame member 14. To facilitate assembly, the housing and frame members 14 and 15 are horizontally split in planes passing through the axes of shafts 13 and 17.

In this instance the pinion shaft 17 is driven in either direction from a unidirectional driver, such as the flywheel 20 of an internal combustion engine, through two selectively operable clutches. The driver, pinion shaft, and clutches are preferably coaxially disposed for the sake of compactness. The clutches shown are of the fluid pressure type, such as described in the Fawick Patent No. 2,141,645, affording torsional and angular flexibility to damp out torsional oscillations and to compensate for inaccurate alignment, and also affording an ease of control not ordinarily available in clutches of mechanical type.

Each of the clutches shown includes an flexible annular fluid pressure container 21—22, of rubber or rubber and fabric, carried by the flywheel 20. In this instance each container 21—22 is attached to a ring 23—24, fixed to the flywheel, and is expandable into frictional gripping engagement with the periphery of an inner concentric rotor or wheel 25—26.

The wheel 25 is keyed or otherwise fixed to the rearwardly projecting end of the pinion shaft 17, and the wheel 26 is supported by the shaft 17 through appropriate bearings 27 which permit free rotation thereof relative to the shaft. The wheel 25 is thus permanently connected to the pinion 11 for rotation therewith, the other wheel 26 being connected to the pinion for reverse rotation through gearing such as will now be described.

Gearing for this purpose may assume various forms, but that shown comprises a bevel gear 28 fixed to the hub 29 of the wheel 26 and meshing with two coaxial bevel gears 30 which in turn mesh with a bevel gear 31 keyed or otherwise fixed to the pinion shaft 17, preferably between the pinion 11 and its bearing 18. The two bevel gears 30 are preferably floatably mounted in such manner as to insure that the total torque load transmitted by them from gear 28 to gear 31 is equally divided between them, and so that the tangential reactions of the two gears 30 upon the gear 28 are equal and in opposite directions, thereby avoiding a radial thrust upon the projecting end of the pinion shaft 17 that might otherwise be imposed by an unbalanced tangential reaction resulting from the torque load.

In this instance each gear 30 is keyed or otherwise fixed to a separate hollow shaft 32 (Fig. 2) journalled at its outer end in appropriate thrust sustaining bearings 33 fixed in a cage 34. Each cage 34 is closely fitted for free axial movement within a horizontal bore 35 formed in the housing frame member 14. A roller bearing 36 supports the inner end of each hollow shaft 32, the outer race of the bearing 36 being fixed in the frame member 14 while the inner race is fixed to the shaft 32 but freely movable axially with respect to the bearing rollers. Both gears 30 and their supporting shafts 32 are thus mounted for free axial movement radially of the gears 28 and 31 and are thus yieldable to radial thrusts imposed by the latter as a result of gear tooth reactions therebetween.

However, provision is made for constraining the two gears 30 to move axially as a unit. For this purpose a tie rod 37 is provided extending through each of the hollow shafts 32, the inner ends of the rods being fixed to a free-floating ring segment 38 underlying the pinion shaft 17, and the outer end of each rod being fixed to the adjacent bearing cage 34. The tie rods 37 and connector 38 coact with the cages 34 and shafts 32 to securely hold the gears 30 against axial displacement relative to each other, but permit both to shift as a unit in a manner to equalize the gear tooth reactions between them and the gears 28 and 31 and to thus insure that each transmits its one half share of the total torque load.

The arrangement is such that when the container 21 of one of the clutches is expanded into pressure contact with wheel 25, the pressure in the other container 22 being released, the pinion 11 is driven in one direction by and with the fly-wheel 20; and when the pressure in container 21 is released and the container 22 of the other clutch expanded into pressure contact with the wheel 26, the pinion 11 is driven in the opposite direction through the gears 28, 30, and 31. The containers 21 and 22 are expanded and released by the application and release of fluid pressure, preferably air pressure, transmitted in this instance through the pinion shaft 17.

For this purpose a pair of concentric tubes 39 and 40 are provided which extend axially through the pinion shaft 17 and are freely rotatable relative thereto. Both tubes are connected to rotate with the fly-wheel 20, the outer tube 39 being connected thereto through a pipe 41 which communicates with the interior of a head 42 fixed on the rear end of the tube 39, and the inner tube 40 being connected to the fly-wheel through a similar pipe 43 which communicates with the interior of a head 44 fixed to the projecting end of the inner tube. Pipe 41 communicates with the container 22 of one clutch through appropriate passages 45, and pipe 43 communicates with the container 21 of the other clutch through appropriate passages 46. A head 47, fixed to the forward ends of both tubes 39 and 40, has a central passage 48 (Fig. 3) which communicates with tube 40 and a plurality of passages 49 which communicate with the tube 39.

Provision is made for admitting and releasing fluid pressure to or from the tube 39 through the passages 49 or to or from the tube 40 through the passage 48 while the head 47 and tubes are rotating. The device shown for this purpose comprises a flanged housing 50 fixed to the head 47 and having a hollow trunion 51 journalled in suitable bearings 52 in a non-rotating housing 53. A plate 54, secured between the head 47 and housing 50, is provided with ports 55 which register with the passages 49 and provide communication between them and the interior of housing 50. The plate 54 is provided with a central boss 56 having a central passage 57 which provides communication between the passage 48 and a tube 58 carried by the boss and extending axially through the trunion 51 into the non-rotating housing 53. The tube 58 is additionally supported and fixed by a nut 59 seated in the housing 50 and perforated to afford communication between the housing 50 and trunion 51.

The non-rotating housing 53 has a chamber 60 which communicates with the tube 58 and with a pipe 61. The chamber is sealed by a flexible diaphragm in the form of a thin metallic disk 62 supported at its periphery within the non-rotating housing 53 and having a central opening 63 which registers with the bore of the tube 58. A thickened annular portion 64 surrounding the opening 63 is in sealing contact with the end face of a nipple 65, fixed to the end of the tube 58.

A second chamber 66 within the non-rotating housing 53 communicates with a pipe 67 and with the rotating housing 50 through the hollow trunion 51. Opposite sides of the compartment are sealed by flexible diaphragms 68 and 69 somewhat similar to diaphragm 62, both being supported at their peripheries within the housing 53. Diaphragm 68 has a central opening 70 which registers with the bore in the trunion 51 and which is surrounded by a thickened portion 71 which is in sealing contact with the end face of the trunion; and diaphragm 69 has a central opening 72 to accommodate the tube 58 and which is surrounded by a thickened portion 73 which is in sealing contact with a flange 74 on the nipple 65.

The arrangement is such that whenever fluid pressure is supplied to the pipe 61, from any appropriate pressure source, it is transmitted therefrom through the chamber 60, tube 58, passages 57 and 48, tube 40, pipe 43, and passages 46 to the pressure container 21 of one clutch to close that clutch and thus effect forward operation of the pinion 11 and gear 10. To reverse the operation, the pressure in pipe 61 is released and fluid pressure applied to the other pipe 67, this pressure being transmitted through chamber 66, trunion 51, housing 50, passages 49, tube 39, pipe 41, and passages 45 to the pressure container 22 of the other clutch to thereby close the latter and cause the pinion 11 and gear 10 to be reversely driven through the gears 28, 30 and 31.

It will of course be understood that fluid pressure admitted to the chamber 60 acts on the diaphragm 62 to increase the sealing pressure thereof against the nipple 65, and that similarly fluid pressure admitted to chamber 66 increases the sealing pressure of the diaphragm 68 against the trunnion 51 and the sealing pressure of diaphragm 69 against the flange 74 on the nipple 65.

Various changes may be made in the embodiment of the invention hereinabove specifically described without departing from or sacrificing the advantages of the invention as defined in the appended claims.

I claim:

1. A reversible power transmission comprising a rotary driver, a pair of clutches disposed coaxially thereof and arranged to be driven thereby, a shaft connected with one of said clutches, a gear rotatably mounted on and supported by said shaft and connected with the other of said clutches, a second gear operatively connected to and supported by said shaft, and torque transmitting means connecting said first and second named gears for rotation in opposite directions, said last named means including a plurality of torque transmitting elements symmetrically disposed with respect to said shaft and freely movable as a unit transversely of said shaft so as to automatically distribute the torque load on said elements and thereby effect such rotation without imposing a radial load on said shaft.

2. A reversible power transmission comprising a rotary driver, a pair of clutches arranged to be driven thereby, a driven member operatively connected with one of said clutches, a bevel gear operatively connected with the other of said clutches, a second bevel gear operatively connected with said member, a plurality of bevel gears each meshing with said first and second named bevel gears, and means connecting said last named plurality of bevel gears for free movement as a unit relative to said first and second named gears to thereby automatically equalize the load on said plurality of gears.

3. In a power transmission the combination of a rotary driver, a driven member, two clutch elements coaxially disposed within said driver, a driving connection between each of said clutch elements and said driven member, two fluid pressure glands carried by said driver and radially expansible into gripping engagement with said elements respectively, and means extending through the center of said clutch elements and rotatable with said driver for conducting fluid pressure to said glands selectively.

4. In a power transmission the combination of a housing, a gear train including a gear therein, a separately mounted driver outside of said housing at one side thereof, two clutch elements supported by said housing and coaxially disposed within said driver, a driving connection between each of said clutch elements and said gear train, two fluid pressure glands within said driver and radially expansible to effect a driving engagement between said driver and said clutch elements alternatively, said glands being flexible to accommodate misalignment between the axes of said driver and said clutch elements, and means extending axially through said gear for supplying fluid pressure to said glands selectively.

5. In a power transmission the combination of a housing, a pinion therein, a shaft supporting said pinion and projecting from said housing, a bearing in said housing providing support for the projecting end of said shaft, a bevel gear fixed to said shaft at one side of said bearing, a second bevel gear supported by and surrounding said shaft at the opposite side of said bearing, means including a third bevel gear providing a driving connection between said first named gears, a rotary driver, and two clutches alternatively operable to connect said driver to said shaft or to said second named gear.

WALTER P. SCHMITTER.